United States Patent
Izumiya

(10) Patent No.: US 11,165,736 B2
(45) Date of Patent: Nov. 2, 2021

(54) E-MAIL DISPLAY DEVICE AND NON-TRANSITORY COMPUTER READABLE MEDIUM STORING PROGRAM

(71) Applicant: FUJIFILM Business Innovation Corp., Tokyo (JP)

(72) Inventor: Toru Izumiya, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/535,041

(22) Filed: Aug. 7, 2019

(65) Prior Publication Data

US 2020/0304449 A1 Sep. 24, 2020

(30) Foreign Application Priority Data

Mar. 20, 2019 (JP) .............................. JP2019-052821

(51) Int. Cl.
*H04L 12/58* (2006.01)
*G06Q 10/10* (2012.01)

(52) U.S. Cl.
CPC ........... *H04L 51/26* (2013.01); *G06Q 10/107* (2013.01); *H04L 51/12* (2013.01); *H04L 51/34* (2013.01)

(58) Field of Classification Search
CPC ...... G06Q 10/107; G06Q 50/01; G06Q 10/06; G06Q 10/06311; G06Q 10/101; G06Q 30/02; G06Q 30/0255; H04L 51/22; H04L 51/26; H04L 67/22
See application file for complete search history.

(56) References Cited

U.S. PATENT DOCUMENTS

| | | | | |
|---|---|---|---|---|
| 8,032,602 B2* | 10/2011 | Lavoie | .................... | H04L 51/26 709/206 |
| 8,423,459 B1* | 4/2013 | Green | .................. | G06Q 20/384 705/39 |
| 8,848,879 B1* | 9/2014 | Coughlan | ............... | H04M 1/57 379/88.12 |
| 9,185,067 B1* | 11/2015 | Isaacs | .................... | G06F 16/955 |
| 9,256,862 B2* | 2/2016 | Lai | ........................ | G06Q 10/107 |
| 2006/0111894 A1* | 5/2006 | Sammarco | ............. | G06Q 10/06 704/9 |
| 2007/0003029 A1* | 1/2007 | Vesterinen | ............... | H04L 51/04 379/88.14 |
| 2007/0043822 A1* | 2/2007 | Brumfield | ............... | H04L 51/26 709/207 |
| 2009/0125602 A1* | 5/2009 | Bhatia | ..................... | H04L 51/26 709/207 |
| 2009/0156160 A1* | 6/2009 | Evans | ..................... | H04W 4/90 455/404.2 |
| 2010/0124196 A1* | 5/2010 | Bonar | ................... | H04W 16/16 370/329 |

(Continued)

FOREIGN PATENT DOCUMENTS

JP 2006-209323 8/2006
JP 2012-190336 10/2012

*Primary Examiner* — David R Lazaro
(74) *Attorney, Agent, or Firm* — JCIPRNET

(57) ABSTRACT

An e-mail display device includes an e-mail reception unit that receives an e-mail, a display unit that displays information indicative of the received e-mail according to a priority, and a reflection unit that performs a process of reflecting a priority between a first user and a second user into a priority between the first user and a third user who has a prescribed relationship with the second user.

13 Claims, 12 Drawing Sheets

(56) References Cited

U.S. PATENT DOCUMENTS

| | | | | |
|---|---|---|---|---|
| 2010/0325584 A1* | 12/2010 | McKenzie | ............ | G06Q 50/18 |
| | | | | 715/835 |
| 2012/0030734 A1* | 2/2012 | Wohlert | ............... | H04W 60/00 |
| | | | | 726/4 |
| 2012/0221961 A1* | 8/2012 | Reynolds | ............... | H04L 51/12 |
| | | | | 715/752 |
| 2012/0226763 A1* | 9/2012 | Roskind | ................. | H04L 51/04 |
| | | | | 709/206 |
| 2013/0024577 A1* | 1/2013 | Krishnaswamy | ..... | G06F 21/552 |
| | | | | 709/227 |
| 2013/0086177 A1* | 4/2013 | Becker, IV | ......... | G06Q 10/107 |
| | | | | 709/206 |
| 2013/0166574 A1* | 6/2013 | Kang | ..................... | G06F 16/16 |
| | | | | 707/749 |
| 2013/0262171 A1* | 10/2013 | Solodko | ............... | H04W 4/029 |
| | | | | 705/7.18 |
| 2014/0089306 A1* | 3/2014 | Rana | ................ | G06F 16/24578 |
| | | | | 707/731 |
| 2015/0045068 A1* | 2/2015 | Soffer | .................... | G01C 21/20 |
| | | | | 455/456.3 |
| 2015/0088784 A1* | 3/2015 | Dhara | ..................... | G06N 5/02 |
| | | | | 706/11 |
| 2016/0162601 A1* | 6/2016 | Wohlert | ............. | G06F 3/04817 |
| | | | | 707/748 |
| 2017/0200093 A1* | 7/2017 | Motahari Nezhad | ... | G06F 40/30 |
| 2017/0278146 A1* | 9/2017 | Sumida | ................ | G06K 9/6222 |
| 2018/0144305 A1* | 5/2018 | Kenthapadi | .......... | G06Q 10/103 |
| 2019/0124169 A1* | 4/2019 | Sundin | ................ | G06Q 10/101 |
| 2020/0304449 A1* | 9/2020 | Izumiya | ............... | G06Q 10/107 |

* cited by examiner

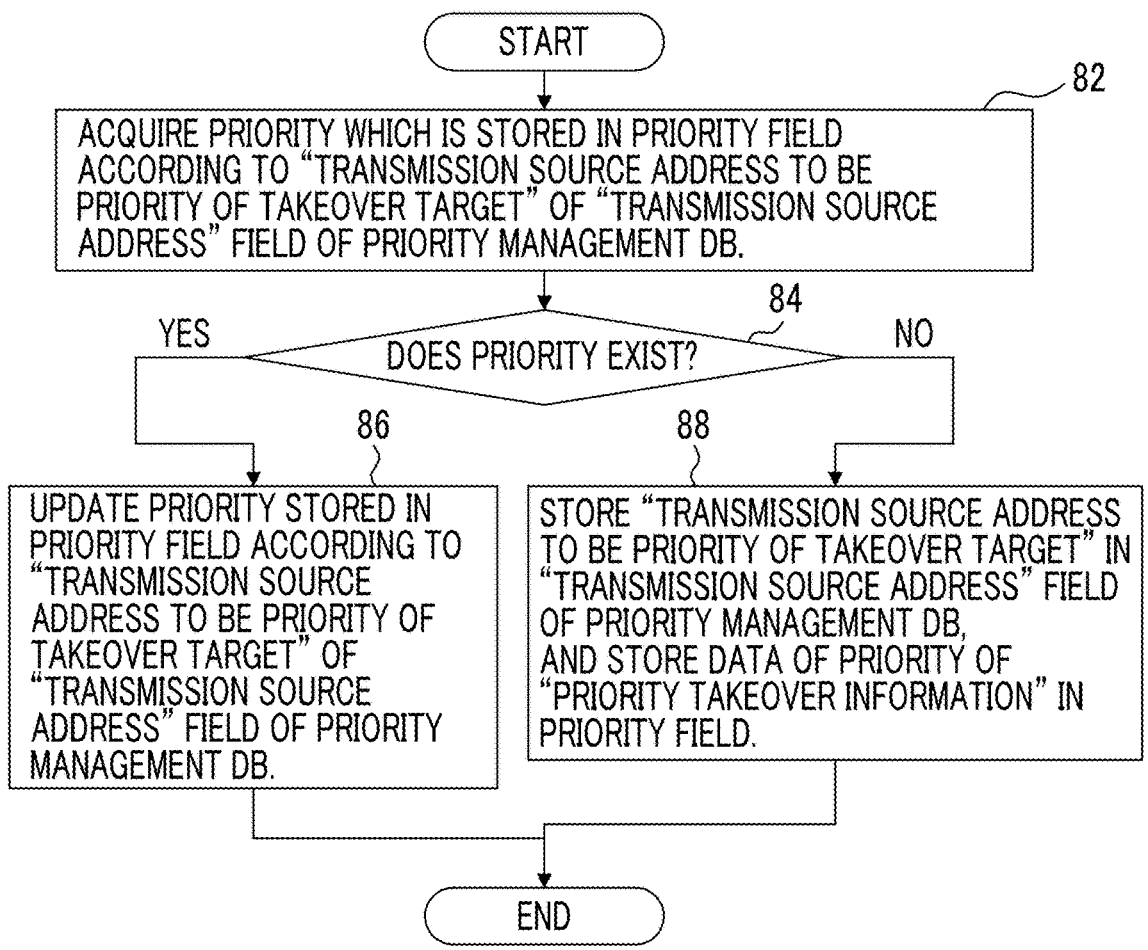
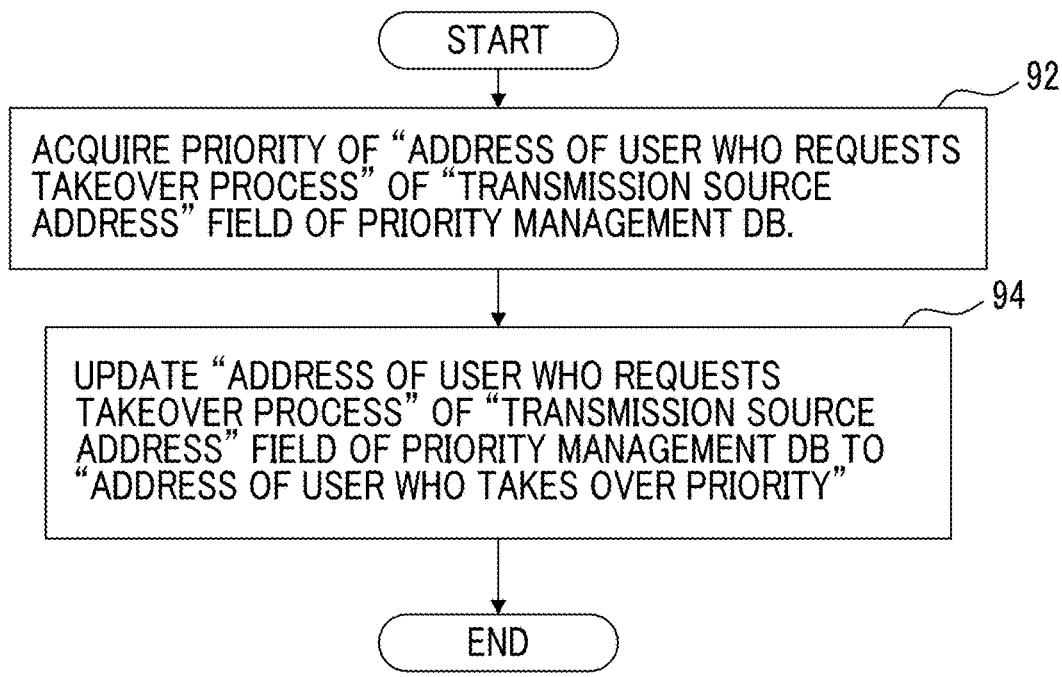

FIG. 7

| No | DISPLAY NAME | DEPARTMENT NAME | MAIL ADDRESS |
|----|--------------|-----------------|--------------|
| ☑ 1 | PERSON A | ○▲ DEPARTMENT | AXX@yyy.zzz |
| ☐ 2 | PERSON C | ■○ DEPARTMENT | CXX@yyy.zzz |
| ☐ 3 | PERSON D | ○○ DEPARTMENT | DXX@yyy.zzz |
| ☐ 4 | PERSON E | ○○ DEPARTMENT | EXX@yyy.zzz |
| ☐ 5 | PERSON F | ▲▲ DEPARTMENT | FXX@yyy.zzz |
| ☐ 6 | PERSON G | ▲▲ DEPARTMENT | GXX@yyy.zzz |

SEARCH  CLEAR

ADD  CLOSE

| FROM | PERSON B |
| --- | --- |
| DESTINATION ... | PERSON A |
| TAKEOVER DESTINATION ... | PERSON C |
| TITLE | NOTIFICATION OF WORK TRANSFER DUE TO PERSONAL TRANSFERS |
| CONTENT | ALWAYS THANK YOU FOR YOUR HELP.<br><br>IT'S PERSONAL MATTER, BUT I WILL MOVE TO OO DEPARTMENT ON APRIL 1, SO I WILL REPORT.<br><br>MY WORK IS TO BE TRANSFERRED TO SUCCESSOR C FROM O MONTH. SINCE I WILL TAKE OVER PERFECTION, I APPRECIATE YOUR KIND COOPERATION. |

TRANSMIT     CANCEL

250

E-MAIL DISPLAY DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-052821 filed Mar. 20, 2019.

BACKGROUND

(i) Technical Field

The present invention relates to an e-mail display device and a non-transitory computer readable medium storing a program.

(ii) Related Art

JP2006-209323A discloses a mail check system including a mail storage unit that stores a received mail, an arrived mail reception unit that stores a mail received from a mail server in the mail storage unit, a mail operation unit that performs an operation instructed by a user with respect to a mail designated by the user among mails stored in the mail storage unit, and an outline list display unit that, in a case where a list of outlines of the respective mails stored in the mail storage unit is displayed, determines an outline display order based on transmission source addresses of the respective mails, a transmission source address of the mail operated using the mail operation unit, and content of the operation.

SUMMARY

In a case where a change in a successor occurs due to transfer of a predecessor, the number of mail exchanges with the successor is small, and an outline display order is low.

Aspects of non-limiting embodiments of the present disclosure relate to provide an e-mail display device and a non-transitory computer readable medium storing a program, which enable information indicative of an e-mail from a third user who has a prescribed relationship with a second user to be displayed, similarly to an e-mail from the second user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an e-mail display device including: an e-mail reception unit that receives an e-mail; a display unit that displays information indicative of the received e-mail according to a priority; and a reflection unit that performs a process of reflecting a priority between a first user and a second user into a priority between the first user and a third user who has a prescribed relationship with the second user.

BRIEF DESCRIPTION OF THE DRAWINGS

Exemplary embodiment(s) of the present invention will be described in detail based on the following figures, wherein:

FIG. 4 is a flowchart illustrating a flow of a takeover process in step S74, which is performed using the client terminal 10C used by the user C, of FIG. 3;

FIG. 5 is a flowchart illustrating a flow of a notification reflection process in step S76, which is performed using the client terminal 10A used by the user A, of FIG. 3;

FIG. 7 is a diagram illustrating an example of a destination selection screen 200;

FIG. 8 is a diagram illustrating an example of a screen 250 for performing priority takeover information transmission;

DETAILED DESCRIPTION

Hereinafter, an exemplary embodiment of the present invention will be described with reference to the accompanying drawings.

Figure 1:
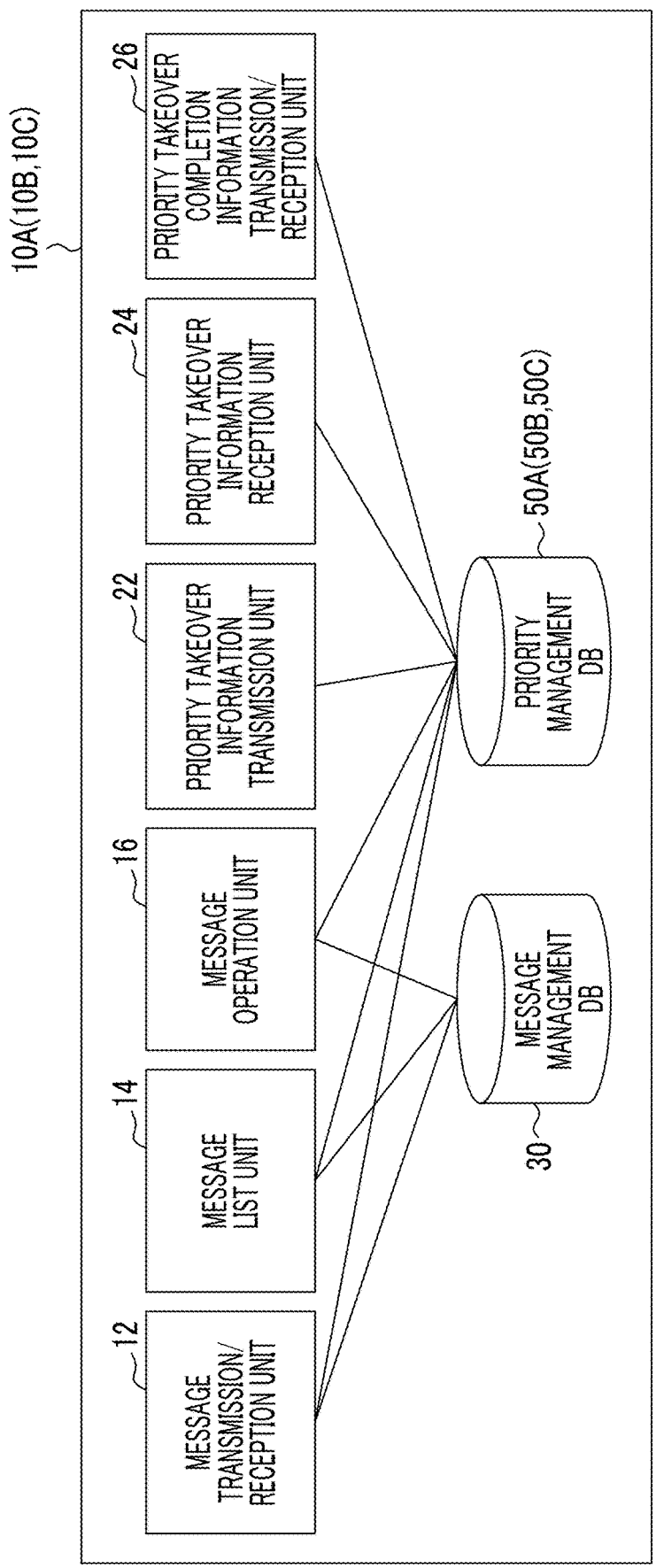
FIG. 1 is a schematic diagram illustrating client terminals 10A to 10C used by respective users A to C.
Figure 13:
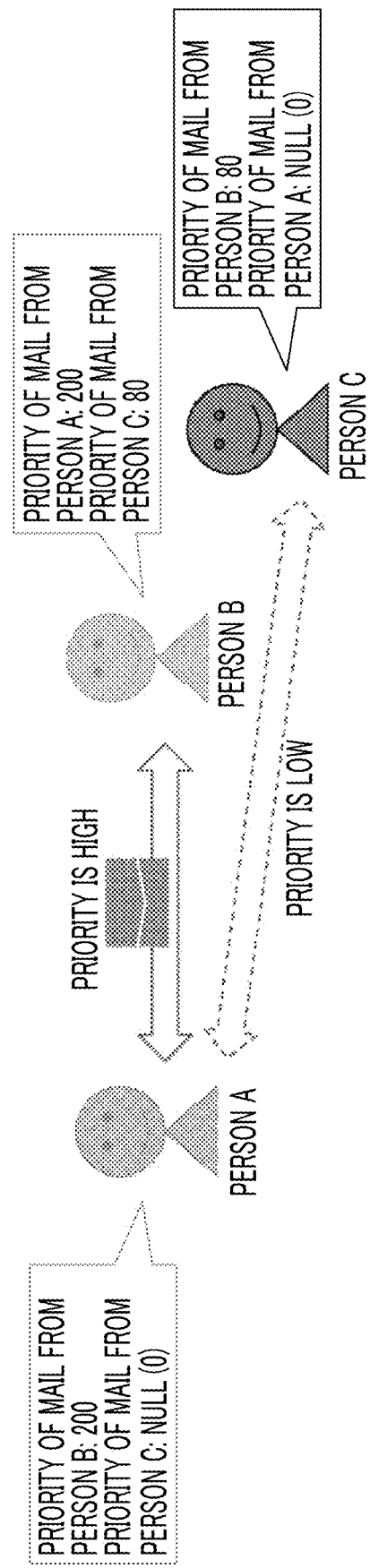
FIG. 13 is a diagram illustrating an example of content of priority fields of the priority management DBs 50A to 50C of the client terminals 10A to 10C used by the respective users A to C before the takeover.

FIG. 1 is a schematic diagram illustrating client terminals 10A to 10C used by respective users A to C (also refer to FIG. 13). Meanwhile, in the drawing, the respective users A to C are described as a person A, a person B, and a person C. Since configurations of the client terminals 10A to 10C are the same, hereinafter, the configuration of the client terminal 10A will be described, and the configurations of other client terminals 10B and 10C will not be described.

As illustrated in FIG. 1, the client terminal 10A includes a message transmission/reception unit 12, a message list unit 14, a message operation unit 16, and a message management DB 30. The client terminal 10A includes a priority takeover information transmission unit 22, a priority takeover information reception unit 24, a priority takeover completion information transmission/reception unit 26, and a priority management DB 50A. The client terminal 10A is formed of a computer device, and includes a computer (which includes a CPU, a ROM, a RAM, and an input/output port), an external storage device connected to the computer, a communication unit which communicates with another client terminal, a display, a mouse, a keyboard, and the like. Programs for respective processes (refer to FIGS. 2 to 6), which will be described later, are stored in the ROM or the external storage device. The respective units (12, 14, 16, 22, 24, and 26) illustrated in FIG. 1 are functional units of the CPU. In a case where the CPU performs the programs of the respective processes (refer to FIGS. 2 to 6), the CPU functions as the respective units (12, 14, 16, 22, 24, and 26). The message management DB 30 and the priority management DB 50A are provided in the external storage device.

The client terminals 10A to 10C are examples of an "e-mail display device" of a technology according to the exemplary embodiment of the present disclosure. The programs of the respective processes (refer to FIGS. 2 to 6) are examples of a "program" of the technology according to the exemplary embodiment of the present disclosure. The message transmission/reception unit 12 illustrates an example of an "e-mail reception processing unit" of the technology according to the exemplary embodiment of the present disclosure, the message list unit 14 illustrates an example of a "display processing unit" of the technology according to the exemplary embodiment of the present disclosure, and the priority takeover information reception unit 24 illustrates an example of a "reflection unit" of the technology according to the exemplary embodiment of the present disclosure.

The message management DB 30 is a database (hereinafter, referred to as a "DB") which stores message information.

Figure 9:
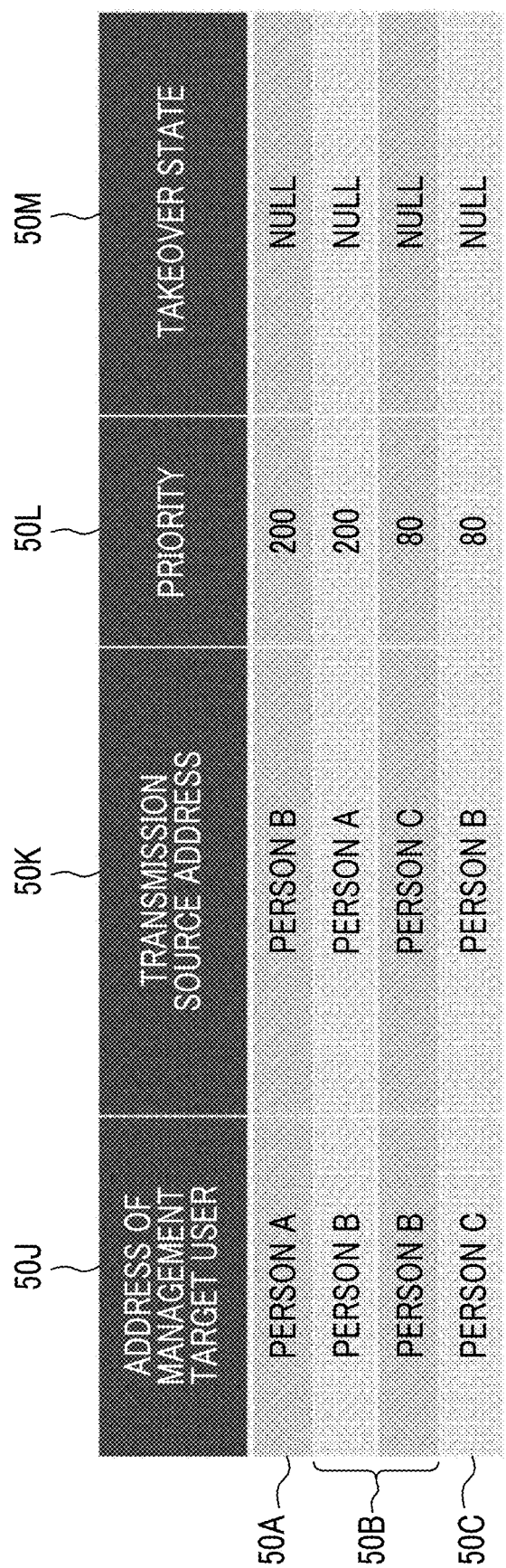
FIG. 9 is a diagram illustrating an example of content stored in priority management DBs 50A to 50C of the client terminals 10A to 10C used by the respective users A to C before takeover.

The priority management DB 50A is a DB which stores information (a transmission source address, a priority, a takeover state, or the like) relevant to the priority (refer to FIG. 9). FIG. 9 illustrates an example of content stored in the priority management DBs 50A to 50C of the client terminals 10A to 10C used by the respective users A to C before the takeover. As illustrated in FIG. 9, each of the priority management DBs 50A to 50C includes fields 50J to 50M for storing an address of each of the users A to C (management target users), a transmission source address from which an e-mail (hereinafter, referred to as a "message") is transmitted to the management target users (A to C), a priority between a user of the transmission source address and the management target user, and the takeover state (which will be described in detail later).

Here, the priority is a value according to a number of times that the management target user transmits the message to the user of the transmission source address within a unit period (for example, one week [meanwhile, the unit period is not limited to one week and may be one month, two months, . . . , and the like]). For example, a first value (for example, 0) is acquired in a case where the number of transmissions within the unit period is less than a first threshold, a second value (>the first value, for example, 80) is acquired in a case where the number of transmissions within the unit period is equal to or larger than the first threshold and is less than a second threshold (>the first threshold), and a third value (>the second value, for example, 200) is acquired in a case where the number of transmissions within the unit period is equal to or larger than the second threshold.

Here, the threshold is not limited to three types of values, such as the first value to the third value, and may be two types of values or four or more types of values.

In addition, the priority may be a value according to the number of times that the management target user receives the message from the user of the transmission source address within the unit period, or may be a value according to the number of times that the message is transmitted and received between the management target user and the user of the transmission source address within the unit period.

Furthermore, the priority is not limited to be set based on at least one of the number of times that the message is transmitted or the number of times that the message is received within the unit period, and may be automatically set by a client terminal as below based on a part to which a user who transmits and receives the mail belongs. For example, in a case where a user L and a user M belong to the same part, the priority is the third value. In a case where the user L belongs to a first part, a user N belongs to a second part, and the first part is related to the second part, the priority is the second value. In a case where a user P belongs to a third part and the first part is not related to the third part, the priority is the first value.

In addition, the priority is not limited to be automatically set by the client terminal, and each user may individually and manually determine a priority between the user and another user. Meanwhile, even in a case where the priority is automatically set by the client terminal, each user may individually and manually correct the priority.

The message transmission/reception unit 12 transmits or receives the message, stores the transmitted or received message in the message management DB 30, and, in addition, updates the priority between the management target user and the user of the transmission source address for each transmission of the message.

The message list unit 14 displays a message list. In a case where the list is displayed, the message list unit 14 acquires the priority between the management target user and the user of the transmission source address of each message from the priority management DB 50A, sorts the message according to the priority, and displays information which indicates the message according to a result of the sort.

Here, the information indicative of the messages includes, for example, at least apart of a transmission source address of the message as first information, a subject of the message as second information, and content of the message as third information. In a case where the list is displayed, at least one of the first information to the third information is displayed.

The message operation unit 16 performs an operation (reply, deletion, or the like) with respect to the message. The message operation unit 16 reflects a result of the operation with respect to the message to the message management DB 30, and updates (for example, increases) a priority between the management target user and the user of the transmission source address of an operation target message according to the performed operation.

The priority takeover information transmission unit 22 prepares "priority takeover information", and transmits the prepared "priority takeover information". Meanwhile, the "priority takeover information" is an example of "information indicative of reflection of the priority" of the technology according to the exemplary embodiment of the present disclosure.

The "priority takeover information" includes an "information type", an "address of user who requests takeover process", a "transmission source address to be priority of takeover target", the "priority of takeover target", and an "address of user who takeovers priority".

The "information type" is information indicative of a type of the "priority takeover information". In the exemplary embodiment, the "priority takeover information" has two types. Information indicative of a first type is "takeover information" for updating information of the user who takeovers the priority. Information indicative of a second type is "notification information" for providing a notification that the priority is taken over.

As illustrated in FIG. 13, for example, content of the "priority takeover information" will be described using an example in which there are the user A and the user B who performs an exchange of a message, the user B is transferred, and the user C takeovers work of the user B and performs the exchange with the user A from now on. Meanwhile, the user C has a relationship (an example of a prescribed relationship) of a successor with the user B.

In the example, the user B requests the user A and the user C to perform a process of reflecting a priority between the user A and the user B into a priority between the user A and the user C who has the prescribed relationship with the user B.

In the example, the "address of user who requests takeover process" is an address of the user B. The "transmission source address to be priority of takeover target" is an address of the user A. The "priority of takeover target" is 200 (refer to a priority field 50L of the priority management DB 50B of FIG. 9). An "address of user who takes over priority" is an address of the user C.

Content of the "information type" is as follows. Although description will be performed in detail later, in the example, a client terminal 10B of the user B requests the client terminals 10C and 10A to reflect (take over) the priority (200) between the user B and the user A into the priority between the user C and the user A.

Specifically, the client terminal 10B requests the client terminal 10C to update the priority of a field 50L of a priority management DB 50C to 200. Therefore, the "takeover information", which is the first type, is designated for the "information type".

In addition, the user B provides a notification that the user C takes over the user B to the user A. In the "information type" of the "priority takeover information", which is transmitted to the client terminal 10A by the client terminal 10B, the "notification information", which is the second information, is designated.

The priority takeover information reception unit 24 receives the "priority takeover information" which is transmitted by the priority takeover information transmission unit 22.

Figure 11:
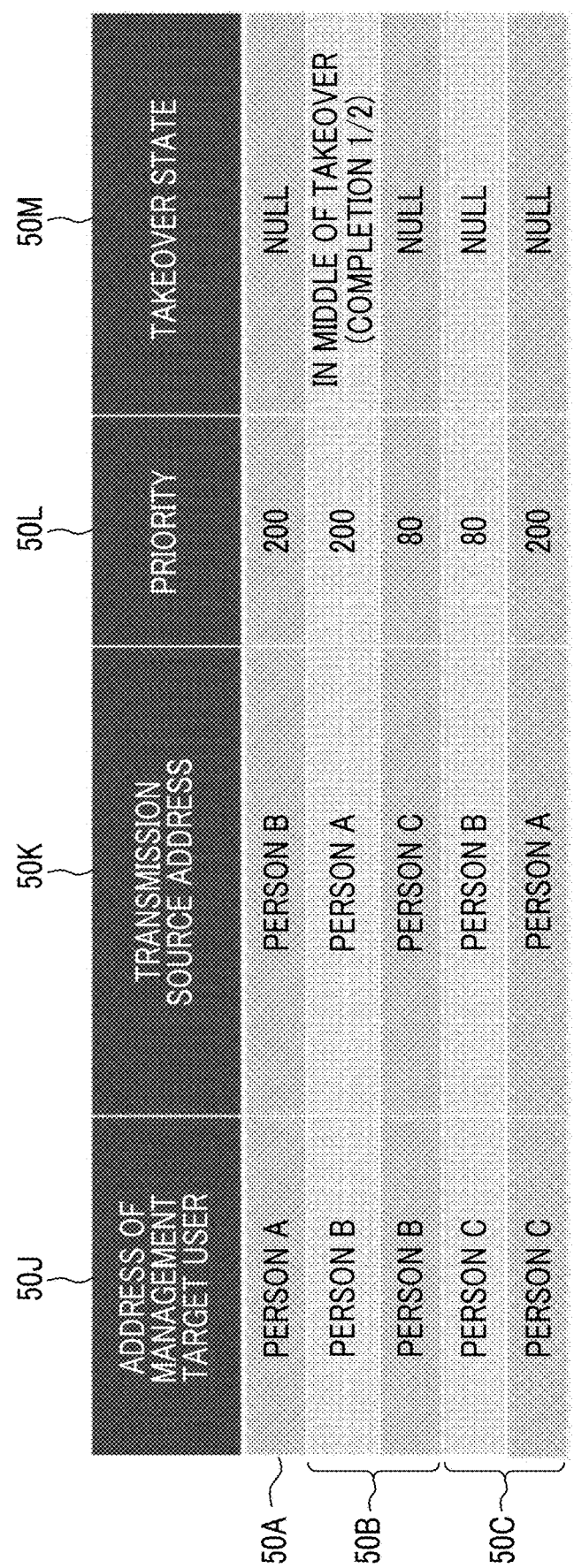
FIG. 11 is a diagram illustrating an example of the content stored in the priority management DBs 50A to 50C of the client terminals 10A to 10C used by the respective users A to C in a middle of the takeover.

In a case where the priority takeover information reception unit 24 of the client terminal 10C receives the "priority takeover information" in which the "takeover information" is designated as the "information type", the priority takeover information reception unit 24 newly prepares the "transmission source address to be priority of takeover target" included in the "priority takeover information", that is, a row for the user A in the priority management DB 50C, and reflects (takes over) the priority (200) between the user B and the user A into the priority between the user C and the user A, illustrated in FIG. 11.

Figure 12:
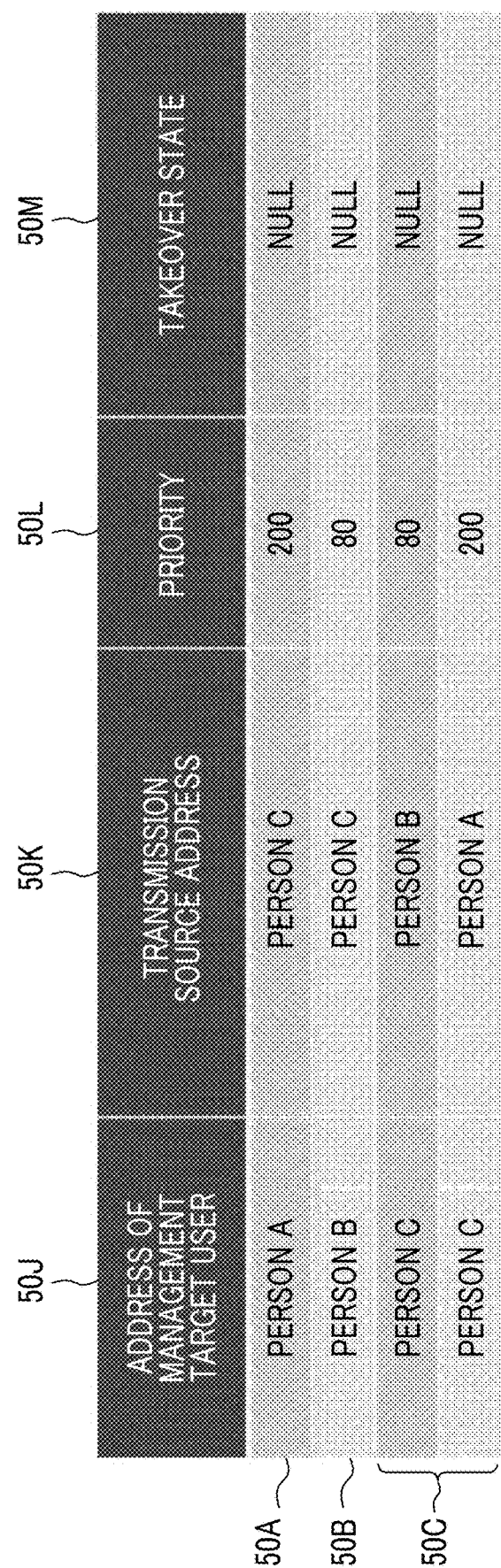
FIG. 12 is a diagram illustrating an example of the content stored in the priority management DBs 50A to 50C of the client terminals 10A to 10C used by the respective users A to C in a case where the takeover is completed.

In addition, in a case where the priority takeover information reception unit 24 of the client terminal 10A receives the "priority takeover information", in which the "notification information" is designated as the "information type", the priority takeover information reception unit 24 updates the transmission source address (the address of the user B [refer to FIGS. 9 to 11]), to which the "priority takeover information" is transmitted, of a transmission source address field 50K of the priority management DB 50A of the client terminal 10A to the "address of user who takes over priority" included in the "priority takeover information", that is, the address of user C (refer to FIG. 12).

The priority takeover completion information transmission/reception unit 26 transmits and receives completion of the priority takeover. In a case where the priority takeover completion information transmission/reception unit 26 of the client terminal 10B receives the completion of all the takeover information, the priority takeover completion information transmission/reception unit 26 deletes a row, in which the transmission source address is the "transmission source address to be priority of takeover target", of the priority management DB 50B. In the example, the priority takeover completion information transmission/reception unit 26 deletes a row in which the transmission source address is the address of the user A. That is, the priority takeover completion information transmission/reception unit 26 deletes the row, in which the transmission source address is the address of the user A, of the priority management DB 50B illustrated in FIGS. 9 to 11, as illustrated in FIG. 12.

Subsequently, an effect of the exemplary embodiment will be described. As illustrated in FIG. 13, for example, the effect of the exemplary embodiment will be described using an example in which there are the user A and the user B who performs the exchange of the message, the user B is transferred, and the user C takes over the work of the user B and performs the exchange with the user A from now on.

Figure 2:
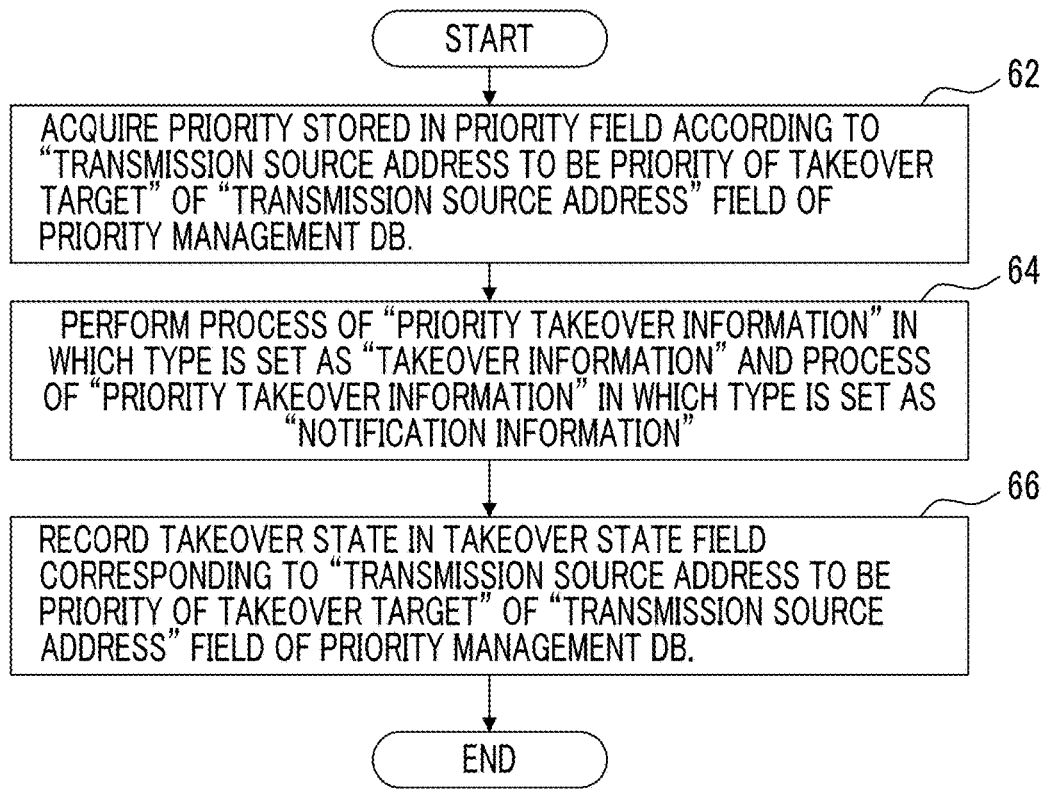
FIG. 2 is a flowchart illustrating a flow of a priority takeover information transmission process performed using the client terminal 10B used by the user B.

FIG. 2 is a flowchart illustrating a flow of a priority takeover information transmission process performed by the priority takeover information transmission unit 22 of the client terminal 10B used by the user B.

In the example, the user B displays a destination selection screen 200 illustrated in FIG. 7 on a display which is not illustrated in the drawing by performing a prescribed start instruction, checks a check box of the user A using the destination selection screen 200, and presses an add button. Therefore, the destination selection screen 200 is switched to a screen 250, illustrated in FIG. 8, for performing priority takeover information transmission, and the address of the user A, which is established in the destination selection screen 200, is designated (meanwhile, written as "person A" in FIG. 8) for a destination field of the switched screen 250 for performing the priority takeover information transmission. With regard to the user B, the "address of user who takes over priority", that is, the address of the user C is designated to a "takeover destination" field of the screen 250 for performing the priority takeover information transmission (meanwhile, written as "person C" in FIG. 8).

The user B inquires about prescribed content for each of a title field and a content field.

In a case where above input ends, a state is acquired in which it is possible to ask the priority takeover information transmission process.

In a case where a plurality of selections are performed in the destination selection screen 200 illustrated in FIG. 7, a connection of the takeover is provided to a plurality of persons. In a case where the plurality of persons are simultaneously taken over in the screen 250, illustrated in FIG. 8, for performing the priority takeover information transmission, the plurality of persons are added to the destination.

In this case, the plurality of persons may be individually added, and the takeover may be performed in each department unit. A partner who performs exchange, which is necessary to be taken over to a new person in charge, is designated in each department unit in association with data for managing an affiliated department or the like of the user.

Therefore, in a case where the department is moved due to transfer or the like, takeover labors are reduced.

In addition, in a case where a title (subject) is a specific text string in the screen 250, illustrated in FIG. 8, for performing the priority takeover information transmission, the priority takeover information transmission is performed through normal message transmission by determining a rule in which the takeover information transmission is performed while an address written in a destination (TO) is set as the "transmission source address to be priority of takeover target" and an address written in CC which is not illustrated in the drawing is set as the "address of user who takes over priority".

In a case where the above-described input ends and a transmission button is operated by the user B in the screen 250, illustrated in FIG. 8, for performing the priority takeover information transmission, the priority takeover information transmission process illustrated in FIG. 2 starts.

In step S62, the priority takeover information transmission unit 22 of the client terminal 10B acquires the "transmission source address to be priority of takeover target" of the "transmission source address" field 50K of the priority management DB 50B (refer to FIG. 9), that is, the priority (200) stored in the priority field 50L according to the user A.

In step S64, the priority takeover information transmission unit 22 performs a process of the "priority takeover information" in which the type is set as the "takeover information" and a process of the "priority takeover information" in which the type is set as the "notification information".

The process of the "priority takeover information" in which the type is set as the "takeover information" is preparation and transmission of the "priority takeover information" in which the type is set as the "takeover information". The process of the "priority takeover information" in which the type is set as the "notification information" is preparation and transmission of the "priority takeover information" in which the type is set as the "notification information".

In the "priority takeover information" in which the type is set as the "takeover information" and the "priority takeover information" in which the type is set as the "notification information", the pieces of information are as follows. The "address of user who requests takeover process" is the address of the user B. The "transmission source address to be priority of takeover target" is the address of the user A. The "priority of takeover target" is 200 (refer to the priority field 50L of the priority management DB 50B of FIG. 9). The "address of user who takes over priority" is the address of the user C. Meanwhile, the addresses, which are designated using the screen 250 illustrated in FIG. 8, are used as the respective addresses.

As described above, the priority takeover information transmission unit 22 prepares the "priority takeover information" in which the type is set as the "takeover information" and the "priority takeover information" in which the type is set as the "notification information". The priority takeover information transmission unit 22 transmits the "priority takeover information" in which the type is set as the "takeover information" to the client terminal 10C of the user C, and transmits the "priority takeover information" in which the type is set as the "notification information" to the client terminal 10A of the user A.

Figure 10:
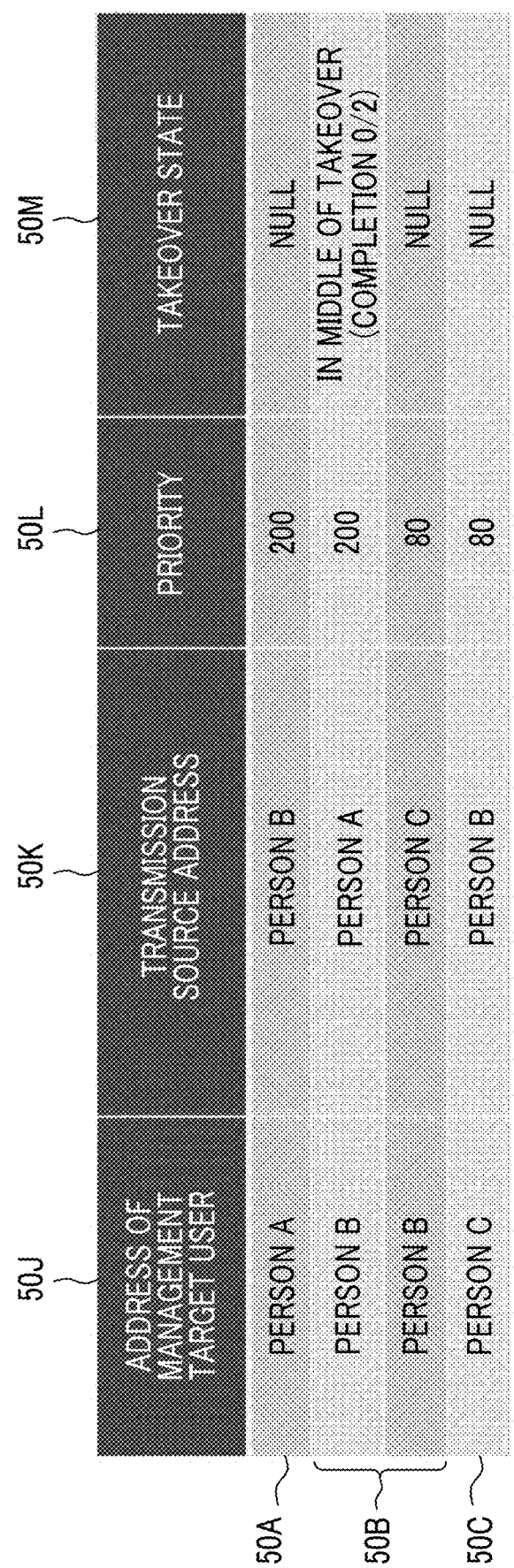
FIG. 10 is a diagram illustrating an example of the content stored in the priority management DBs 50A to 50C of the client terminals 10A to 10C used by the respective users A to C after the priority takeover information transmission.

In step S66, the priority takeover information transmission unit 22 records the takeover state, that is, "in the middle of takeover (completion 0/2)" in the "transmission source address to be priority of takeover target" of the "transmission source address" field 50K of the priority management DB 50B, that is, the takeover state field 50M corresponding to the user A, as illustrated in FIG. 10. Meanwhile, the takeover state may be normally displayed while the takeover process is being continued such that the user B recognizes a state of the takeover, or may be displayed in a case where an instruction is provided.

Figure 3:
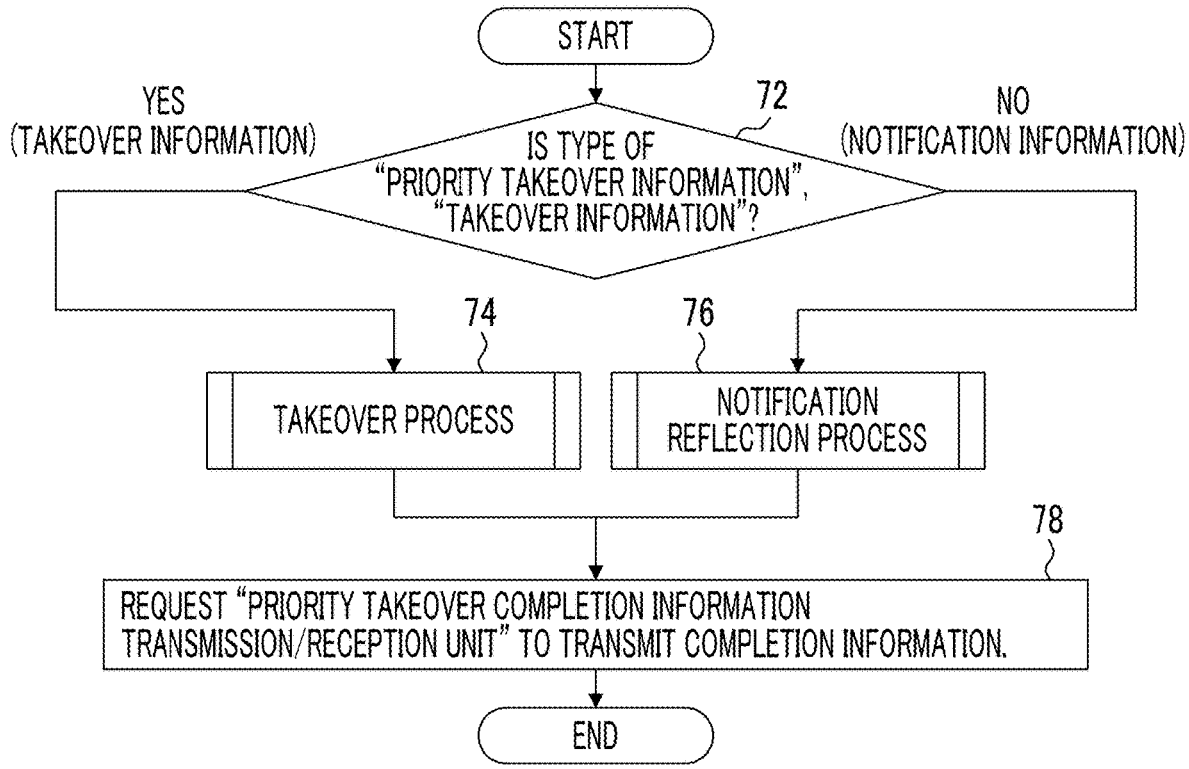
FIG. 3 is a flowchart illustrating a flow of the priority takeover information transmission process performed using the client terminals 10A and 10C used by the respective users A and C.

FIG. 3 is a flowchart illustrating a flow of a priority takeover information reception process performed by each of the client terminals 10A and 10C used by the respective user A and the user C.

In step S64 of FIG. 2, the "priority takeover information" in which the type is set as the "takeover information" is transmitted to the client terminal 10C, the "priority takeover information" in which the type is set as the "notification information" is transmitted to the client terminal 10A, and the priority takeover information reception unit 24 of each of the client terminals 10A and 10C receives each of the pieces of "priority takeover information". Therefore, the priority takeover information reception process of FIG. 3 starts.

In step S72, the priority takeover information reception unit 24 determines whether the type of the "priority takeover information" is the "takeover information" or the "notification information".

In a case where it is determined that the type of the "priority takeover information" is the "takeover information", the priority takeover information reception unit 24 performs the takeover process (refer to FIG. 4), which will be described in detail later, in step S74. Specifically, the priority takeover information reception unit 24 of the client terminal 10C performs the process in step S74.

In a case where it is determined that the type of the "priority takeover information" is the notification information, the priority takeover information reception unit 24 performs a notification reflection process (refer to FIG. 5), which will be described in detail later, in step S76. Specifically, the priority takeover information reception unit 24 of the client terminal 10A performs the process in step S74.

In step S78, the priority takeover information reception unit 24 requests the "priority takeover completion information transmission/reception unit" to transmit completion information.

FIG. 4 is a flowchart illustrating a flow of the takeover process in step S74, which is performed using the client terminal 10C used by the user C, of FIG. 3.

In step S82, the priority is acquired which is stored in the priority field 50L according to the "transmission source address to be priority of takeover target" of the "transmission source address" field 50K of the priority management DB 50C (refer to FIG. 9) and the address of the user A.

In step S84, the priority takeover information reception unit 24 determines whether or not the priority exists. In a case where the user C already performs transmission/reception of the message with the user A, there is a case where the address of the user A is stored in the transmission source address field 50K of the priority management DB 50C. In this case, it is determined that the priority exists. In step S86, the priority takeover information reception unit 24 updates the priority stored in the priority field 50L according to the "transmission source address to be priority of takeover target" of the "transmission source address" field 50K of the priority management DB 50C, that is, the address of the user A. For example, in a case where the previously stored priority is 80, the priority is changed to 200. Meanwhile, in a case where the previously stored priority is 200, the priority remains as 200.

In a case where the user C does not perform the transmission/reception of the message with the user A, the address of the user A is not stored in the transmission source address field 50K of the priority management DB 50C, as illustrated in FIG. 9. In this case, it is determined that the priority does not exist. In step S88, the priority takeover information reception unit 24 stores the "transmission source address to be priority of takeover target", that is, the address of the user A in the "transmission source address" field 50K of the priority management DB 50C, and stores the priority 200 of the "priority takeover information" in the priority field 50L, as illustrated in FIG. 11.

Subsequent to the processes in steps 86 and 88, the process returns to step S78 of FIG. 3.

FIG. 5 is a flowchart illustrating a flow of the notification reflection process in step S76, which is performed using the priority takeover information reception unit 24 of the client terminal 10A used by the user A, of FIG. 3.

In step S92, the priority takeover information reception unit 24 acquires the priority 200 of the priority field 50L corresponding to the "address of user who requests takeover process" of the "transmission source address" field 50K of the priority management DB 50A and the address of the user B.

In step S94, the priority takeover information reception unit 24 updates the "address of user who requests takeover process" of the "transmission source address" field 50K of the priority management DB 50A and the address of the user B, as illustrated in FIG. 11, to the "address of user who takes over priority" and the user C as illustrated in FIG. 12.

Subsequent to the process in step S94, the process returns to step S78 of FIG. 3.

In step S78 of FIG. 3, the priority takeover information reception unit 24 requests the priority takeover completion information transmission/reception unit 26 to transmit the completion information. The priority takeover completion information transmission/reception unit 26 of each of the client terminals 10A and 10C transmits the completion information to the client terminal 10B.

Figure 6:
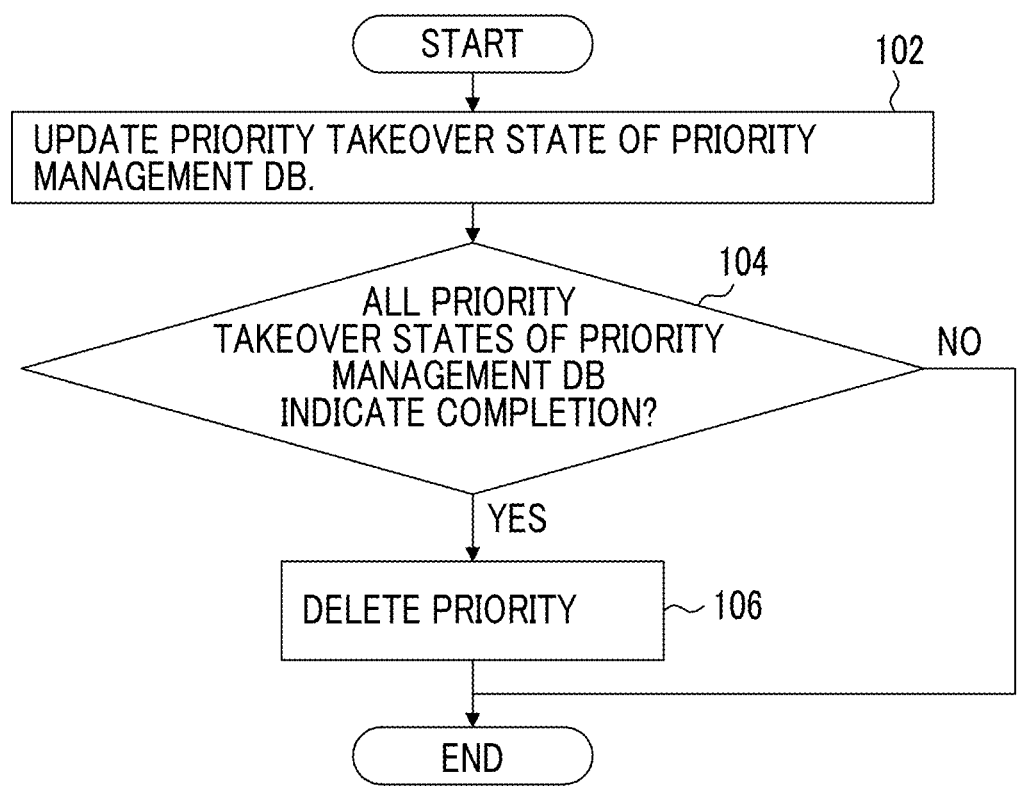
FIG. 6 is a flowchart illustrating a flow of a priority takeover completion information reception process performed using the client terminal 10B used by the user B.

FIG. 6 is a flowchart illustrating a flow of a priority takeover completion information reception process performed using the client terminal 10B used by the user B. The priority takeover completion information reception process illustrated in FIG. 6 starts in a case where the priority takeover completion information transmission/reception unit 26 of each of the client terminals 10A and 10C transmits the completion information and the priority takeover information reception unit 24 of the client terminal 10B receives the completion information.

In step S102, the priority takeover information reception unit 24 updates content of the priority takeover state field 50M of the priority management DB 50B. For example, in a case where the priority takeover information reception unit 24 of the client terminal 10B initially receives the completion information transmitted by the priority takeover completion information transmission/reception unit 26 of the client terminal 10A, the priority takeover information reception unit 24 updates the content of the priority takeover state field 50M of the priority management DB 50B to "in the middle of takeover (completion ½)".

In step S104, the priority takeover information reception unit 24 determines whether or not all priority takeover states of the priority management DB 50B indicate completion. The determination is continued until all the priority takeover states of the priority management DB indicate completion.

In the example, in a case where the priority takeover information reception unit 24 of the client terminal 10B subsequently receives the completion information transmitted by the priority takeover completion information transmission/reception unit 26 of the client terminal 10C, the determination in step S104 becomes positive determination.

In a case where the determination in step S104 becomes the positive determination, the priority takeover information reception unit 24 deletes the priority in step S106. Specifically, a row in which the address of the user A is stored in the transmission source address field 50K is deleted.

Figure 14:
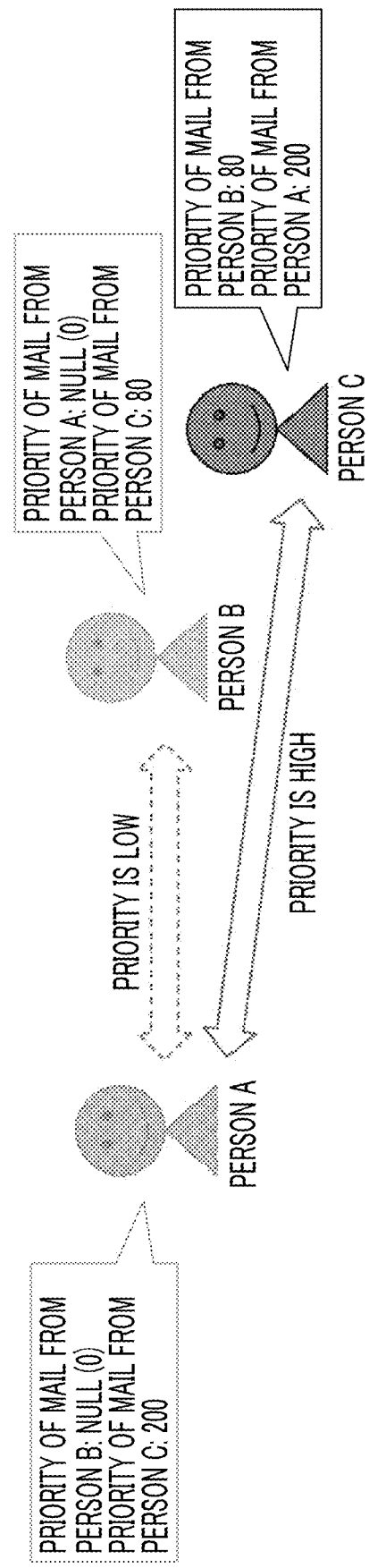
FIG. 14 is a diagram illustrating an example of the content of the priority fields of the priority management DBs 50A to 50C of the client terminals 10A to 10C used by the respective users A to C after the takeover.

The above process will be described with reference to FIGS. 13 and 14. FIG. 13 is a diagram illustrating an example of content of the priority fields 50L of the priority management DBs 50A to 50C of the client terminals 10A to 10C used by the respective users A to C before the takeover. FIG. 14 is a diagram illustrating an example of the content of the priority fields of the priority management DBs 50A to 50C of the client terminals 10A to 10C used by the respective users A to C after the takeover.

The user A illustrated in FIG. 13 performs exchange of messages with a plurality of users in the course of work. In addition, since the user A receives a plurality of information deployment messages which are not directly replied, the user A displays, checks, and operates the received messages in order of the priority in a case where the work is performed.

The user B is one of the users with which the user A performs the exchange of the messages in the course of the work. Specifically, since the user A and the user B perform the exchange of a large number of messages, the priority between the user A and the user B is relatively high (200). A frequency of the transmission/reception of the messages between the user B and the user C is small compared to a frequency of the transmission/reception of the messages between the user A and the user B, and thus the priority between the user B and the user C is relatively low (80). The user A and the user C do not perform the exchange of the message. Therefore, the priority between the user A and the user C is the lowest (0).

In this case, in a list of the messages of the user A, messages from the user B is displayed such that the priority is relatively high, and the messages from the user C is displayed such that the priority is relatively low.

However, it is assumed that the user B moves to another part due to personal transfers and a charge with respect to the user A is taken over from the user B to the user C. In this case, a person in charge of the exchange of the message with the user A is changed from the user B to the user C. However, the user A and the user C do not perform the exchange of the message.

In this case, in a technology according to the related art, in the list of the messages of the user A, the message of the user C is displayed such that the priority is low. Accordingly, there is a problem in that the user A lately responds to the message from the user C, compared to the message from the user B.

In the exemplary embodiment, in a case where the user B is transferred and the user C takes over from the user B, the connection of the takeover (the priority takeover information transmission) is performed. The user A corresponding to the user who performs the exchange is designated to the destination, and the user C who is a new person in charge is designated to the takeover destination. Due to the connection of the takeover (the priority takeover information transmission), the priority between the user A and the user B is reflected to the priority between the user A and the user C. That is, the priority (0) between the user A and the user C becomes a value (200) of the priority between the user A and the user B, as illustrated in FIG. 14. As above, since the priority of the message from the user C to the user A is the same as the priority of the message from the user B to the user A, a reply of the user A to the message from the user C is the same as a reply of the user A to the message from the user B.

In the above-described exemplary embodiment, information indicative of the message from the user C who is the successor of the user B is displayed on the client terminal of the user A, similarly to the message from the user B.

In the exemplary embodiment, information indicative of the message from the user A is displayed on the client terminal of the user C, similarly to the priority in which the user A displays the message from the user B.

In the above-described exemplary embodiment, the priority of the user B is null (0) in the relationship with the user A. Meanwhile, the exemplary embodiment is not limited to a case where the priority of the user B is null (0). For example, in a case where the user B returns to an original department after the priority of the user B is deleted, the priority may be returned originally, or the priority between the user A and the user B may be set to a priority which is previously set to a previous part to which the user B moved.

In the exemplary embodiment, in a case where the user B is transferred and the user C takes over from the user B, the connection of the takeover (the priority takeover information transmission) is performed to the users A and C by the user B. However, the exemplary embodiment is not limited thereto. For example, the connection of the takeover (the priority takeover information transmission) may be performed to the user A by the user C, or connection is provided to the user C from the user A who has the connection from the user B.

In the exemplary embodiment, the user C has a relationship of the successor of the user B. However, a technology according to the exemplary embodiment of the present disclosure is not limited thereto. The user C may be a user who performs a job relevant to a job of the user B together with the user B, and, specifically, may have a relationship in which the user C belongs to a part to which the user B belongs.

In the exemplary embodiment, furthermore, the takeover information may not be changed until a new person in charge, which is the takeover destination, agrees with the partner who performs the exchange. In addition, it is possible to check whether or not the agreement is performed. Therefore, it is possible to check whether or not a fact that the takeover is being performed is informed to the new person in charge and the partner who performs the exchange.

In the exemplary embodiment, furthermore, a date of the takeover is designated, and the connection of the takeover (the priority takeover information transmission) is performed. The priority is not changed at a point of time of the connection and is changed on a designated date. Therefore, it is possible to perform the connection of the takeover in advance.

In the exemplary embodiment, a case where the priority between the user A and the user B is higher than the priority between the user A and the user C is described as an example. However, the technology according to the exemplary embodiment of the present disclosure is not limited thereto. It is possible to apply a case where the priority between the user A and the user B is lower than the priority between the user A and the user C. For example, the priority (200) between the user A and the user C may be reflected to the priority (80) between the user A and the user B.

In addition, in the exemplary embodiment, a case where the program is previously installed in the ROM or the external storage device is described. However, the exemplary embodiment is not limited thereto. For example, there may be a form in which the program is stored and is provided in a storage medium, such as a Compact Disk Read Only Memory (CD-ROM), or a form in which the program is provided through a network.

Furthermore, in the exemplary embodiment, a case where the process is realized in a software configuration using a computer by executing the program is described. However, the exemplary embodiment is not limited thereto. For example, there may be a form in which the process is realized by a combination of a hardware configuration and the software configuration.

In addition, the configuration of the client terminal described in the exemplary embodiment is an example, and it is apparent that an unnecessary part may be removed or a new part may be added in a range without departing from the gist of the present invention.

In addition, the flow (refer to FIGS. 2 to 6) of the process of the program described in the exemplary embodiment is an example, and it is apparent that an unnecessary step may be removed, a new step may be added, or a processing order may be switched in a range without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An e-mail display device comprising:
   a processor, configured to:
   receive an e-mail from a first user to a third user;
   receive a request of a priority takeover process from a second user to the third user;
   update a priority value between the first user and the third user as a priority value between the first user and the second user in response to the request of the priority takeover process when the third user has a prescribed relationship with the second user,
   wherein the prescribed relationship between the second user and the third user is that the third user is a user designated to perform a job of the second user, instead of the second user;
   sort the received e-mail from the first user to the third user according to the updated priority value;
   and display information indicative of the received e-mail according to a result of the sort.

2. The e-mail display device according to claim 1, wherein the prescribed relationship between the second user and the third user is that the third user is designated as a successor of the second user.

3. The e-mail display device according to claim 2, wherein an initial priority value between the first user and the second user is higher than an initial priority value between the first user and the third user.

4. The e-mail display device according to claim 1,
wherein the prescribed relationship between the second user and the third user is that the third user is a user designated to perform a job relevant to a job of the second user, together with the second user.

5. The e-mail display device according to claim 4,
wherein an initial priority value between the first user and the second user is higher than an initial priority value between the first user and the third user.

6. The e-mail display device according to claim 1,
wherein the prescribed relationship between the second user and the third user is that the third user belongs to a part to which the second user belongs.

7. The e-mail display device according to claim 6,
wherein an initial priority value between the first user and the second user is higher than an initial priority value between the first user and the third user.

8. The e-mail display device according to claim 1,
wherein an initial priority value between the first user and the second user is higher than an initial priority value between the first user and the third user.

9. The e-mail display device according to claim 1,
wherein a user of the e-mail display device is the first user.

10. The e-mail display device according to claim 9,
wherein the processor is configured to receive the information from the e-mail display device of the second user or the third user.

11. The e-mail display device according to claim 1,
wherein a user of the e-mail display device is the third user.

12. The e-mail display device according to claim 11,
wherein the processor is configured to receive the information from the e-mail display device of the second user or the first user.

13. A non-transitory computer readable medium storing a program causing a computer to:
perform a reception process of an e-mail from a first user to a third user;
receive a request of a priority takeover process from a second user to the third user;
update a priority value between the first user and the third user as a priority value between the first user and the second user in response to the request of the priority takeover process when the third user has a prescribed relationship with the second user,
wherein the prescribed relationship between the second user and the third user is that the third user is a user designated to perform a job of the second user, instead of the second user,
sort the e-mail received by the reception process from the first user to the third user according to the updated priority value,
and display information indicative of the e-mail received by the reception process according to a result of the sort.

* * * * *